March 22, 1966  H. CARMICHAEL  3,241,725
PNEUMATIC APPARATUS FOR FACILITATING THE DISCHARGE
FROM CONTAINERS OF POWDERY AND GRANULAR MATERIAL
Filed April 24, 1964  3 Sheets-Sheet 1

March 22, 1966 H. CARMICHAEL 3,241,725
PNEUMATIC APPARATUS FOR FACILITATING THE DISCHARGE
FROM CONTAINERS OF POWDERY AND GRANULAR MATERIAL
Filed April 24, 1964 3 Sheets-Sheet 3

Henry Carmichael.

United States Patent Office 3,241,725
Patented Mar. 22, 1966

3,241,725
PNEUMATIC APPARATUS FOR FACILITATING THE DISCHARGE FROM CONTAINERS OF POWDERY AND GRANULAR MATERIAL
Henry Carmichael, Worcester, England, assignor to Carmichael and Sons (Worcester) Ltd., Worcester, England, a corporation of Great Britain and Northern Ireland
Filed Apr. 24, 1964, Ser. No. 362,390
Claims priority, application Great Britain, Jan. 16, 1964, 1,910/64
4 Claims. (Cl. 222—195)

This invention has reference to pneumatic apparatus for facilitating the discharge from containers of powdery and granular material and is concerned more particularly but not specifically with pneumatic apparatus for facilitating the discharge from bulk transporters of powdery or granular materials which are required to be conveyed by way of a flexible hose to a container which may be situated at an elevated position relatively to the bulk container when at the discharge station.

With transportable bulk containers as aforesaid it is customary to provide the discharge outlet at the rear and on the underside of the bulk container with the consequence particularly when the container is tiltable that the hose may not be able to assume an easy "catenary" from the outlet so that kinking of the hose can occur thereby impairing discharge and occasioning an increase in frictional resistance to the material being discharged.

The present invention has for its primary object to provide pneumatic apparatus for facilitating the discharge of powdery and granular materials from bulk containers which is not subject to the foregoing disadvantage.

Accordingly the invention consists of pneumatic apparatus for facilitating the discharge of powdery and granular materials from containers and resides in providing at the discharge end of the container a discharge box which is set at an angle relatively to the container and which incorporates an aeration device located in the lower portion of the discharge box and an outlet which is located above the aeration device and which continues in an upwardly and outwardly inclined tube to the upper and externally disposed end of which a length of hose may be connected if required, provision being made for introducing pressurised fluid into the discharge box below the aeration device for aerating the material as it is discharged in a manner itself known.

The invention also resides in pneumatic apparatus for facilitating the discharge from containers of powdery and granular materials substantially as will be described hereinafter.

An embodiment of the invention will now be described with particular reference to the accompanying drawings which illustrate the invention as applied to a bulk transporter the container of which is tiltable for facilitating discharge of the contents of the container as and when required.

In the drawings.

In the drawings like numerals of reference indicate similar parts in the several views.

Figure 1:
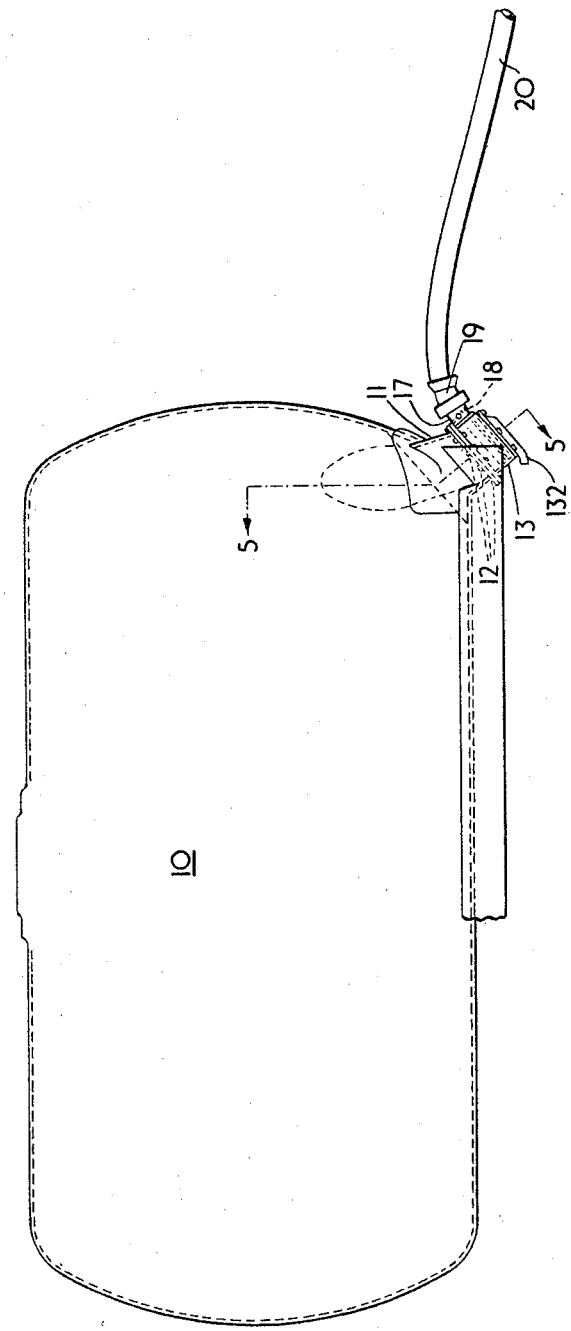
FIGURE 1 is a side elevation illustrating sufficient of a bulk transporter incorporating the invention as is necessary to an understanding of the invention and showing the container of the transporter in the untipped position.
Figure 2:
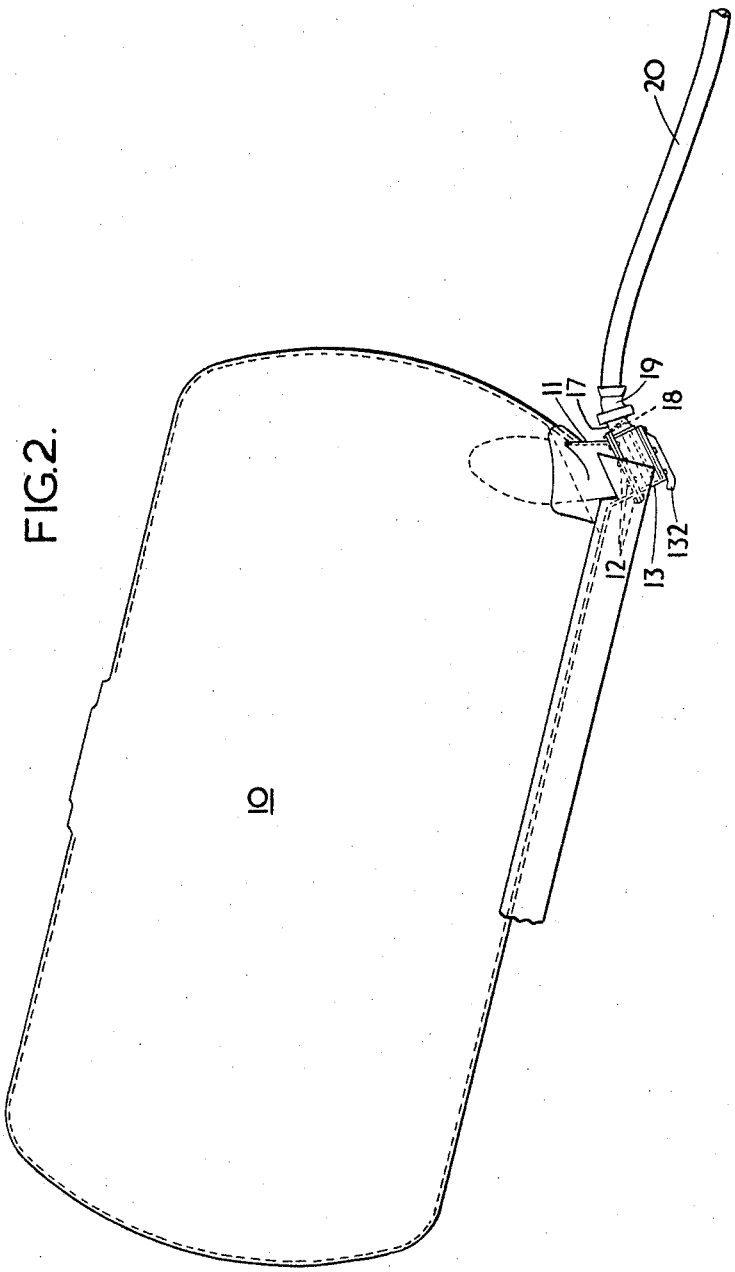
FIGURE 2 is a view generally similar to FIGURE 1 but showing the container in the tipped position.
Figure 3:
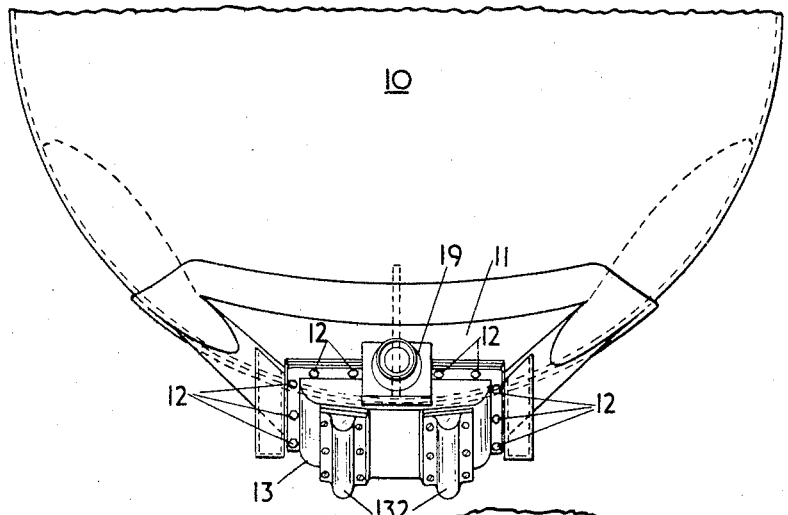
FIGURE 3 is a fragmentary view depicting in end elevation and on an enlarged scale the pneumatic discharge apparatus incorporated in the bulk transporter as illustrated in FIGURES 1 and 2.
Figure 4:
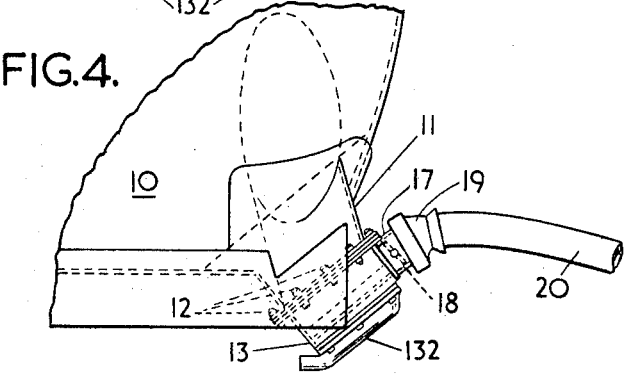
FIGURE 4 is a fragmentary view depicting in side elevation and on an enlarged scale the pneumatic discharge apparatus incorporated in the bulk transporter as illustrated in FIGURES 1 to 3.

According to the said illustrated embodiment of the invention the container 10 is cut away at the rear end at the junction of the wall and the said rear end to provide an outlet opening 101 for the discharge of the contents of the container.

Fitted in an airtight manner to the wall of the container 10 so as to enclose the outlet opening 101 aforesaid is a sheet metal structure 11 hereinafter termed the base 11. This base 11 is of inverted frusto-pyramidical cross section the truncated lower end whereof is provided with an outwardly directed perimetrical flange 111 having therein holes for the passage of bolts 12 for a purpose to be described hereinafter.

Figure 5:
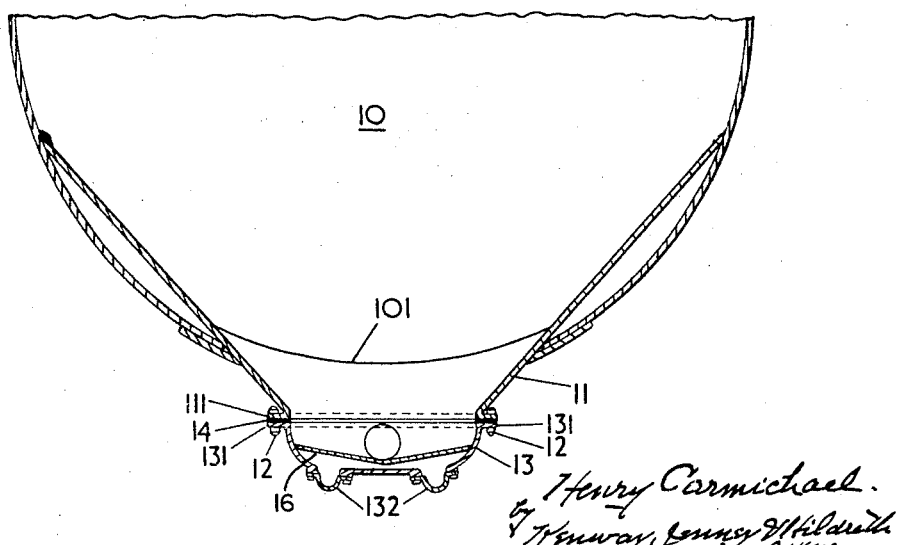
FIGURE 5 is a fragmentary view in section and on an enlarged scale taken on the plane indicated by the line 5—5 in FIGURE 1, looking in the direction of the arrows to the said line.

Adapted to be fitted to the base 11 aforesaid is a sheet metal fitment 13 hereinafter termed the discharge box 13 which is provided around the upper end with a perimetrical flange 131 adapted to be seated against the perimetrical flange 111 of the base 11 so that the two perimetrical flanges 111 and 131 may be secured together by means of nuts and bolts 12 with a resilient washer 14 interposed between the presented surfaces of the respective perimetrical flanges 111 and 131 see particularly FIGURE 5.

Disposed within the discharge box 13 is an aeration device 16 of an obtuse V-shape in cross section and of a known type for aerating the powder adjacent the discharge outlet.

Below the aeration device 16 are inlets 132 for pressurised fluid which conveniently is generated by the engine of the vehicle employed for transporting the container 10.

Disposed above the aeration device 16 is an inclined outlet tube 17 the inner end of which opens into the discharge box 13 above the centre of the aeration device 16. The said tube 17 projects upwardly and outwardly and incorporates a butterfly valve 18 of known construction and manner of operation for opening and closing the outlet tube 17 as may be required. The upper end of the outlet tube 17 is associated with a coupling device 19 of known construction for a flexible hose 20 for conveying the material when discharged from the container 10 to a delivery station (not shown).

Conveniently the base 11 and hence the discharge box 13 is set at an angle of 40° to the chassis 21 upon which the container 10 is mounted.

The pressurized fluid inlets 132 are readily detachable to provide openings in the bottom of the discharge box 13 which permits of access being gained to the interior of the discharge box 13 for servicing purposes even when the container 10 is loaded if this is required.

It will be appreciated that by providing the discharge box 13 with an upwardly and outwardly inclined outlet tube 17 coupling may be effected between a hose 20 and the outlet tube 17 which will permit of the flexible hose 20 assuming an easy "catenary" in all positions of the container 10 whether tilted or not so that kinking of the hose 20 during tilting is avoided.

It is to be understood that the invention may be applied to stationary containers such as silos.

I claim:

1. Pneumatic apparatus for facilitating the discharge of powdery and granular materials from substantially horizontally disposed containers incorporating a discharge opening at the rear end thereof, a structure fixed to the container which encloses the said discharge opening therein and which is set at an angle relatively to the container and which is in communication with the interior of the container, a separately formed discharge box which is adapted to be detachably connected to said structure so as also to be set at an angle relative to the container and which too is in communication with the interior of the container, an aeration device located in the lower portion of the discharge box, an outlet from the discharge box which is located above the aeration device and a discharge tube which projects from the said discharge box and which is upwardly and outwardly inclined, the lower end of the bore whereof opens into said outlet, a hose coupling device fitted to the upper end of the upwardly and outwardly inclined discharge tube, whereby any discharge hose coupled by the coupling device will assume an easy catenary with avoidance of kinking of the hose even when the container is tilted, valve means for controlling the flow of material from the container which is associated with the discharge tube and means for introducing pressurized fluid into the discharge box from the rear of the box which is located on the underside of the discharge box and below the aeration device for aerating the material as it is discharged in a manner itself known, said means for introducing pressurized fluid into the discharge box being detachably associated with the underside of the discharge box thereby permitting said means to be detached for permitting access to be gained to the interior of the discharge box for servicing purposes as required.

2. Pneumatic apparatus for facilitating the discharge of powdery and granular materials from a substantially horizontally disposed container incorporating at the rear end a hinge permitting tilting of the container about the said hinge, a discharge opening at the rear end of the container, a structure fixed to the container which encloses the said discharge opening therein and which is set at an angle relatively to the container and which is in communication with the interior of the container, a separately formed discharged box which is adapted to be detachably connected to said structure so as also to be set at an angle relative to the container and which too is in communication with the interior of the container, an aeration device located in the lower portion of the discharge box, an outlet from the discharge box which is located above the aeration device and a discharge tube which projects from the said discharge box and which is upwardly and outwardly inclined, the lower end of the bore whereof opens into said outlet, a hose coupling device fitted to the upper end of the upwardly and outwardly inclined discharge tube, whereby any discharge hose coupled by the coupling device will assume an easy catenary with avoidance of kinking of the hose even when the container is tilted, valve means for controlling the flow of material from the container which is associated with the discharge tube and means for introducing pressurized fluid into the discharge box from the rear of the box which is located on the underside of the discharge box and below the aeration device for aerating the material as it is discharged in a manner itself known, said means for introducing pressurized fluid into the discharge box being detachably associated with the underside of the discharge box thereby permitting said means to be detached for permitting access to be gained to the interior of the discharge box for servicing purposes as required.

3. Pneumatic apparatus as described in claim 1 in which the container is tiltable and is the container of a bulk transporter.

4. Pneumatic apparatus as described in claim 1 in which the discharge opening is located at the junction of the rear end portion of the container and the rear end wall thereof and in which said structure is united to the container so as to enclose said opening.

References Cited by the Examiner

UNITED STATES PATENTS

| 2,668,085 | 2/1954 | Baresch | 222—193 X |
| 2,721,006 | 10/1955 | Knutsen | 222—195 |
| 2,965,269 | 12/1960 | Knutsen | 222—195 |
| 2,968,425 | 1/1961 | Paton | 222—195 |
| 3,155,287 | 11/1964 | Gist | 222—193 X |

LOUIS J. DEMBO, *Primary Examiner.*

STANLEY H. TOLLBERG, *Examiner.*